US010948362B2

(12) United States Patent
Carluccio et al.

(10) Patent No.: US 10,948,362 B2
(45) Date of Patent: Mar. 16, 2021

(54) PREDICTING TEMPERATURE RESPONSE

(71) Applicant: New York University, New York, NY (US)

(72) Inventors: Giuseppe Carluccio, New York, NY (US); Christopher M. Collins, Elizabethtown, PA (US)

(73) Assignee: NEW YORK UNIVERSITY, New York, NY (US)

( * ) Notice: Subject to any disclaimer, the term of this patent is extended or adjusted under 35 U.S.C. 154(b) by 847 days.

(21) Appl. No.: 14/250,630

(22) Filed: Apr. 11, 2014

(65) Prior Publication Data

US 2014/0310224 A1    Oct. 16, 2014

Related U.S. Application Data

(60) Provisional application No. 61/810,990, filed on Apr. 11, 2013.

(51) Int. Cl.
*G01K 11/30* (2006.01)
*G01K 7/42* (2006.01)
*G06N 99/00* (2019.01)

(52) U.S. Cl.
CPC ............... *G01K 11/30* (2013.01); *G01K 7/42* (2013.01); *G06N 99/00* (2013.01)

(58) Field of Classification Search
CPC ............................... G06N 99/00; G01K 11/30
See application file for complete search history.

(56) References Cited

PUBLICATIONS

G. Brix et al., "Estimation of heat transfer and temperature rise in partial-body regions during MR procedures: An analytical approach with respect to safety considerations", Magnetic Resonance Imaging 20, 2002, pp. 65-76.*
M. W. Dewhirst, "Thermal Dosimetry", ch. 6 in Thermoradiotherapy and Thermochemotherapy, M. H. Seegenschmiedt et al. (eds.), Springer-Verlag Berlin, 1995, pp. 123-136.*
Metcalfe, "The Potential for an Enhanced Role for MRI in Radiation-therapy Treatment Planning", Tech. in Cancer Res. and Treatment, ISSN 1533-0346, vol. 12, No. 5, Oct. 2013, pp. 429-446.*
Bernardi, P., et al., "Specific absorption rate and temperature elevation in a subject exposed in the far-field of radio-frequency sources operating in the 10-900-MHz range", IEEE Transactions on Biomedical Engineering, Mar. 2003, 50(3):295-304.
Cao, Z., et al., "An In Vivo Study on Fast PRF Temperature Imaging based on Compressed Sensing: An Alternative Approach to Monitor RF Safety?", Proc. Intl. Soc. Mag. Reson. Med., 2012, 20:312.
Carluccio, G., "Locally Optimized B1 Field for MRI Systems", University of Illinois at Chicago thesis, 2011, pp. i-130.
Collins, C.M., et al., "SAR and B1 Field Distributions in a Heterogeneous Human Head Model Within a Birdcage Coil", Magnetic Resonance in Medicine, 1998, 40(6):847-856.

(Continued)

*Primary Examiner* — Vincent Gonzales
(74) *Attorney, Agent, or Firm* — Foley & Lardner LLP

(57) ABSTRACT

After the temperature response to a single period of heating (SAR segment) is determined, temperature increases for an arbitrary timecourse of heating is determined based upon a convolution of the temperature response curve for a sequence of different SAR segments.

9 Claims, 4 Drawing Sheets

(56) References Cited

PUBLICATIONS

Collins, C.M., et al., "Temperature and Sar Calculations for a Human Head Within Volume and Surface Coils at 64 and 300 MHz", Journal of Magnetic Resonance Imaging, 2004, 19(5):650-656.

Craciunescu, O.I., et al., "Discretizing large traceable vessels and using DE-MRI perfusion maps yields numerical temperature contours that match the MR noninvasive measurements", Medical Nov. 2001, 28(11):2289-2296.

Das, S.K., et al., "Computational techniques for fast hyperthermia temperature optimization", Medical Physics, Feb. 1999, 26(2):319-328.

Dillenseger, J-L., et al., "Fast FFT-based bioheat transfer equation computation", Computers in Biology and Medicine, 2010, 40(2):119-123.

Labonte, S., "A Computer Simulation of Radio-Frequency Ablation of the Endocardium", IEEE Transactions on Biomedical Engineering, Sep. 1994, 41(9):883-890.

Oh, S., et al., "Experimental and Numerical Assessment of MRI-Induced Temperature Change and SAR Distributions in Phantoms and in Vivo", Magnetic Resonance in Medicine, 2010, 63(1):218-223.

Oh, S., et al., "Method and Tool for Improved, Rapid N-gram Average Sar Determination", Proc. Intl. Soc. Mag. Reson. Med., 2011, 19:3868.

Pennes, H.H., "Analysis of Tissue and Arterial Blood Temperatures in the Resting Human Forearm", Journal of Applied Physiology, Aug. 1948, 1(2):93-122.

Shapiro, E.M., et al., "MR imaging of RF heating using a paramagnetic doped agarose phantom", Magnetic Resonance Materials in Physics, Biology and Medicine, 2000, 10(2):114-121.

Singh, V., et al., "On the Thermal Elevation of a 60-Electrode Epiretinal Prosthesis for the Blind", IEEE Transactions on Biomedical Circuits and Systems, Dec. 2008, 2(4):289-300.

Sullivan, D., "Three-Dimensional Computer Simulation in Deep Regional Hyperthermia Using the Finite-Difference Time-Domain Method", IEEE Transactions on Microwave Theory and Techniques, Feb. 1990, 38(2):204-211.

Van Den Berg, C.A.T., et al., "Simultaneous B1+ Homogenization and Specific Absorption Rate Hotspot Suppression Using a Magnetic Resonance Phased Array Transmit Coil", Magnetic Resonance in Medicine, 2007, 57(3):577-586.

Van Leeuwen, G.M.J., et al., "Numerical Modeling of Temperature Distributions within the Neonatal Head", Pediatric Research, 2000, 48(3):351-356.

Wang, Z., et al., "Consideration of Physiological Response in Numerical Models of Temperature During MRI of the Human Head", Journal of Magnetic Resonance Imaging, 2008, 28(5):1303-1308.

Wust, P., et al., "Simulation studies promote technological development of radiofrequency phased array hyperthermia", Int. J. Hyperthermia, 1996, 12(4):477-494.

Yarmolenko, P.S., et al., "Thresholds for thermal damage to normal tissues: An update", Int. J. Hyperthermia, 2011, 27(4):320-343.

Zhu, Y., "Parallel Excitation With an Array of Transmit Coils", Magnetic Resonance in Medicine, 2004, 51(4): 775-784.

\* cited by examiner

PREDICTING TEMPERATURE RESPONSE

CROSS-REFERENCE TO RELATED APPLICATIONS

This application claims priority to U.S. Provisional Application No. 61/810,990 filed Apr. 11, 2013, which is incorporated by reference herein in its entirety.

STATEMENT OF GOVERNMENT INTEREST

This invention was made with government support under contract no. NIH R01 EB000454 awarded by the National Institutes of Health. The government has certain rights in the invention.

FIELD OF THE INVENTION

The present invention generally relates to systems and methods for predicting temperature in biological tissue or other material. Specifically, systems and methods are provided for calculation of temperature over arbitrary time periods with arbitrary, time-dependent heating levels given a characterization of the temperature response to a single short-term heating period.

BACKGROUND OF THE INVENTION

In many fields, including some in medical practice, it is important to be able to rapidly predict heating of biological tissues or other materials through time. Although temperature through time is the most relevant parameter related to potential damage, in many fields (including Magnetic Resonance Imaging and the mobile phone industry) perceived challenges in predicting temperature have led to use of specific absorption rate ("SAR"), the rate at which energy is absorbed by tissue when exposed to a radio frequency (RF) electromagnetic field, for ensuring safety. SAR is the power absorbed per mass of tissue and is generally measured in units of watts per kilogram (W/kg). Typically, SAR is usually averaged over a known area, either as over the whole body or over a small sample volume (typically 1 g or 10 g of tissue).

Ten grams is a typical volume used most often to assess safety with respect to local tissue heating during MRI. The 10 g averaging is cumbersome and time-consuming to perform and by itself SAR is a quantity with limited direct relation to risk. While temperature increase has a much more intuitive and direct relationship to risk it is typically not calculated at all due to the associated complexity and time requirements. There remains a need for a new method for extremely rapid prediction of temperature increase for time-varying SAR levels after calculating the tissue response to a short SAR segment.

SUMMARY OF THE INVENTION

One embodiment of the invention relates to predicting a change in temperature of the tissue for an arbitrary sequence of SAR segments where the temperature response to a single segment is known.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE PREFERRED EMBODIMENTS

Figure 1:
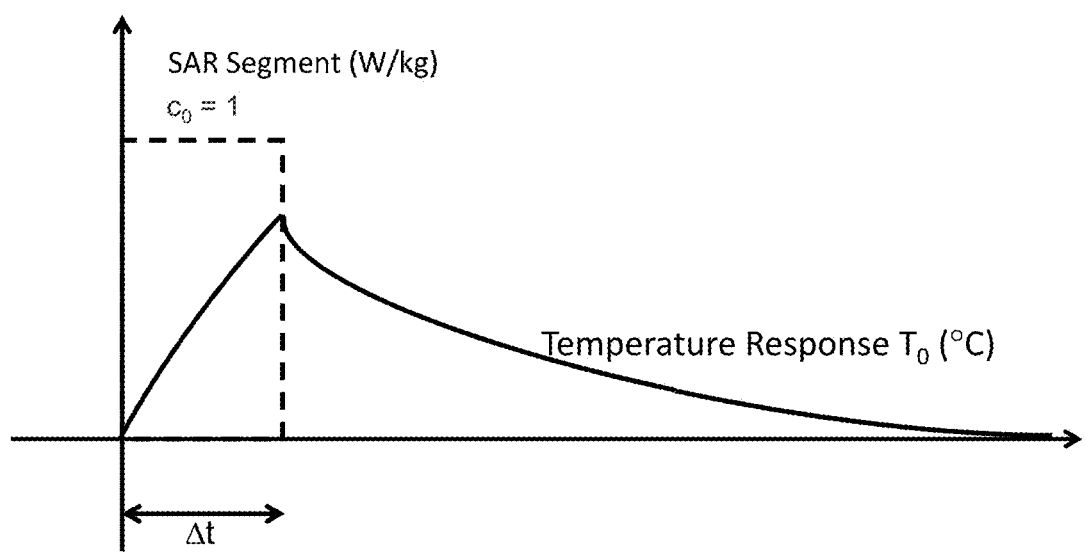
FIG. 1 is a graph of temperature response (solid line) to the application of a single SAR segment (dashed line) of duration Δt. Knowledge of such a response could be characterized with calculation or measurement with a variety of methods in practice, and is required as an input to the method of prediction claimed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In a patient exam, typically a series of sequences with very different power levels and Specific energy Absorption Rate (SAR) levels (and possibly different SAR patterns) are applied. By taking advantage the linear nature of heat equations, it should be possible to predict temperature increase over an entire patient exam after characterizing the temperature response to only a brief period of heating for each SAR pattern. Here an embodiment of a new method for such prediction of temperature increase for time-varying SAR levels after calculating the tissue response to a short SAR segment is provided.

The tissue response to a single short SAR segment can be used to quickly estimate the maximum temperature increase during the application of a sequence of SAR segments of differing amplitudes if the following conditions are satisfied:

The relationship between SAR and temperature is linear. Some physiological parameters may be time invariant.

Figure 2:
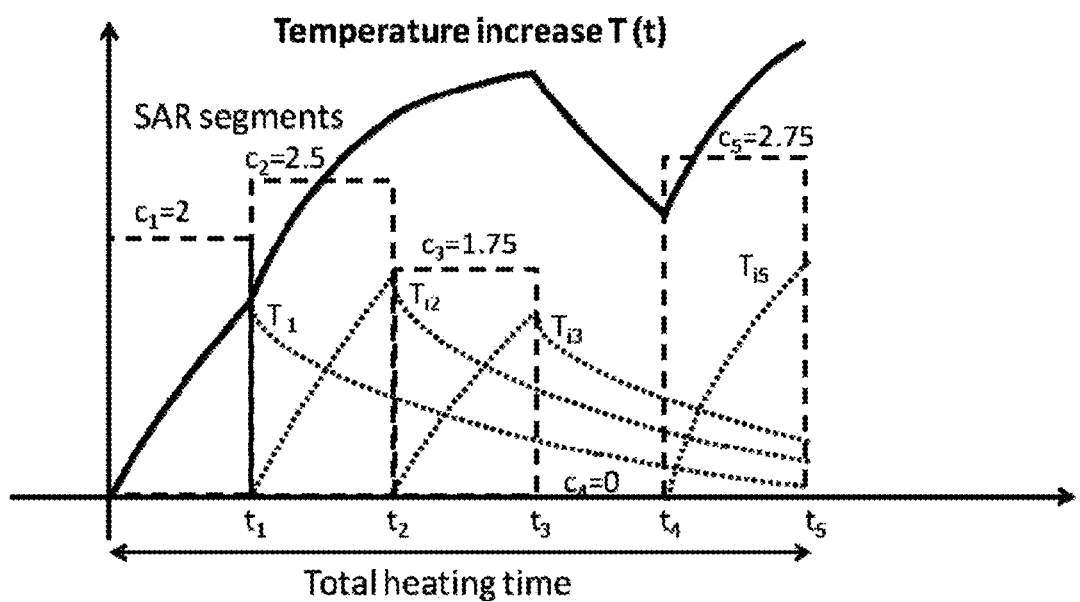
FIG. 2 illustrates a graph of the convolution of the temperature response as in FIG. 1 (dotted) to periods of differing SAR (dashed) to compute the resulting temperature (solid).

The temperature response of each SAR distribution is characterized, though only for one amplitude, These conditions are met, for example, in the commonly-used Pennes bioheat equation if heat capacity c, blood perfusion rate W, thermal conductivity k, and material density □, can be treated as time-invariant $$\rho c \frac{\partial T}{\partial t} = \nabla \cdot (k \nabla T) - W \rho_{bl} c_{bl}(T - T_{bl}) + Q + \rho SAR(t) \quad (1)$$

where subscript bl indicates values for blood and Q is the heat generated by metabolism. While these assumptions of time-invariance have some limitations, they are often made in practice and should give a conservative estimate of temperature so that in estimations designed to ensure safety the temperature will never be underestimated due to these assumptions. Note that it is not required that $T_{bl}$, be time-invariant. If the time dependent term SAR(t) is decomposed into a sequence of short segments applied sequentially, such as $$SAR(t) = c_1 SAR(t_1) + c_2 SAR(t_2) + c_3 SAR(t_3) + \quad (2)$$

where each single $SAR(t_i)$ short segment has duration □t and spatial distribution but can be scaled with the use of the constants $c_i$. In order to predict the temperature increase after a number of arbitrary segments of duration □t, it is necessary to first characterize the tissue response to a single SAR application of duration □t having a scaling factor $c_0$ (FIG. 1). This response can be characterized over time with numerical calculations, estimated based on analytical equations or expectations, or (in principle) experimental measurements. Once the response to one period of heating has been characterized (by any acceptable method, including possibly the Finite Difference Analysis of the Pennes Bioheat Equation), the temperature at any time during the series of arbitrary SAR levels can be calculated by convolving the temperature response curve with the sequence of N scaled segments, as shown in FIG. 2, according to the formula:

$$T_n(t) = \sum_{n=1}^{N} \frac{c_n}{c_0} T_0(t - n\Delta t). \quad (3)$$

where $c_n$, is the amplitude of the $n^{th}$ SAR segment applied, $c_0$ amplitude of t of a SAR segment, $T_n(t)$ is the temperature after the $n^{th}$ SAR segment, and $T_0(t)$ is the temperature response to a SAR segment with amplitude of $c_0$ and duration $\Delta t$ FIG. 1 illustrates the characterization of temperature response $T_0(t)$ to a single SAR Segment with amplitude $c_0$.

The method can be used not only for the Pennes bioheat equation, but for any bioheat model where the relationship between SAR and temperature is linear, such as more complicated models where blood temperature $T_{bl}$ may be time-dependent. The method is also very useful to compute Cumulative Equivalent Minutes at 43 degrees C. (CEM43), a measure of thermal dose that can be used to estimate risk to specific tissue types, since the method allows the rapid prediction of the temperature throughout an entire patient exam. This method could also utilize characterizations based on measured temperature response to a single SAR segment, with the experimentally measured data replacing the numerically calculated data used here. Operating in this way, it may be possible to predict maximum temperature increase without the specific knowledge of the SAR spatial distribution and of the parameters distribution in the tissues, such as c, W, k, ρ, but with the only assumption that they are time invariant and that the relationship among them is linear.

The method provides an accurate prediction of the temperature increase in a short time. In the case where characterization of temperature response to a single heating period can occur a priori (e.g., for a birdcage coil loaded with an available body model) temperature prediction for the entire imaging period is instantaneous, as soon as required patient-specific power levels for the exam are known. In the case where a more subject-specific characterization requires one tenth of the total imaging time, there would be an effective acceleration rate R=10.

Figure 3:
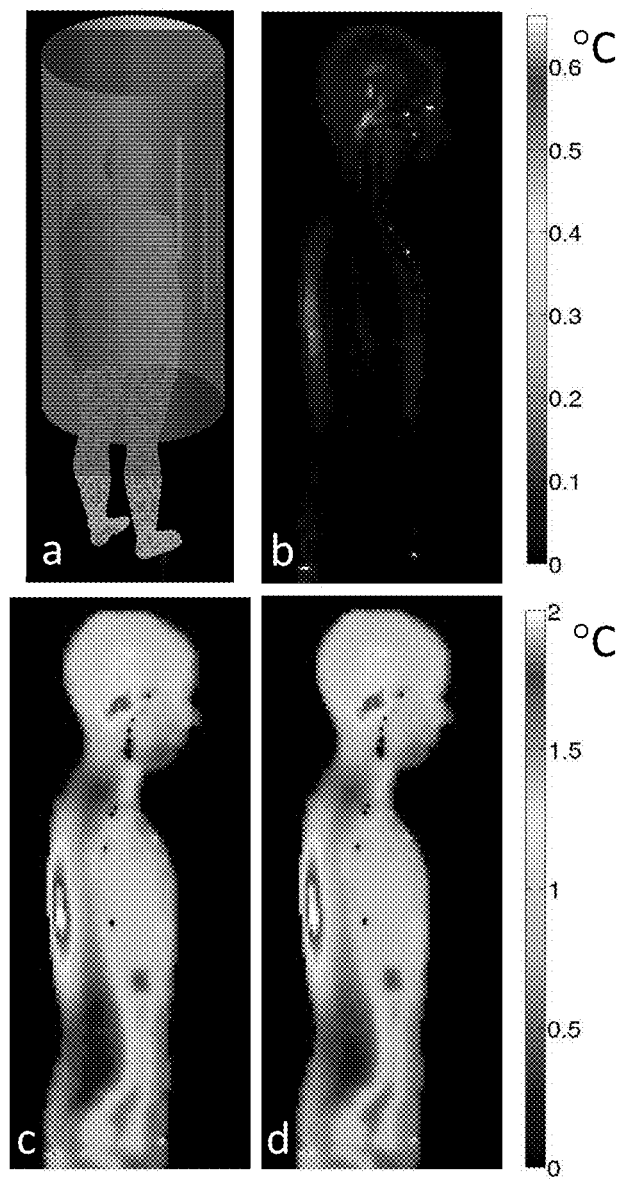
FIG. 3(a) illustrates the geometry of the model used for temperature calculations, FIG. 3 (b) shows the increase in temperature after a one minute segment of heating as characterized with a numerical computation method, and FIG. 3 c) shows the increase in temperature predicted after 30 minutes of heating using the proposed method. To illustrate the accuracy of the proposed method, FIG. 3 (d) shows the temperature increase computed entirely with a numerical computation method as a gold standard. Note that in this illustration the core body temperature ($T_{bl}$) was allowed to change through time.

In one nonlimiting example, a quadrature surface coil is adjacent the occipital lobe with the series of sequences described in FIG. 2. In this specific case, the temperature computation is also many times faster than 10 g SAR determination. Importantly, the maximum accuracy is achieved in the voxels with the highest temperature increase: in one embodiment the difference is less than 1% from values calculated with a much slower conventional method. This is important because, for safety, maximum care is given to the locations with maximum temperature increase, because they may more easily linked to a possible tissue damage. FIG. 3(a) illustrates the geometry of the model used for temperature calculations, FIG. 3 (b) shows the increase in temperature after a one minute segment of heating as characterized with a numerical computation method, and FIG. 3 c) shows the increase in temperature predicted after 30 minutes of heating using the proposed method. To illustrate the accuracy of the proposed method, FIG. 3 (d) shows the temperature increase computed entirely with a numerical computation method as a gold standard. Note that in this illustration the core body temperature ($T_{bl}$) was allowed to change through time.

Certain embodiments can be used with either simulated or measured temperature response, provided relevant physiological parameters are time invariant and the relationship between SAR and temperature is linear. Physiological parameters are expected to remain relatively constant for MRI applications. In case perfusion were to increase with temperature, the presented method gives a conservative prediction of maximum temperature increase.

In one embodiment, the method can be extended to predict temperature increase with the measured data replacing the numerically calculated data, allowing a long term estimate of the temperature without any specific knowledge of the heat parameters and the relationship between SAR and temperature, which is commonly hard to determine.

In one embodiment, the temperature response to a single segment is first computed, and then the long term temperature increase. In contrast, classical systems compute temperature increase from SAR absorption in a forward direct method, In reality, the sequence of power levels of the segments might be changed at any time ("on the fly") during an MRI scan. In the classical method a change in the power level would require to restart the whole process to compute temperature. However, in one embodiment, such a change in the power level of the segment only leads to a change in one term of the convolution eq. (3), rather than requiring the entire computation to be started over. This provides a faster, more useful prediction of temperature increase during MRI scans having any sequence of power levels.)}

Figure 4:
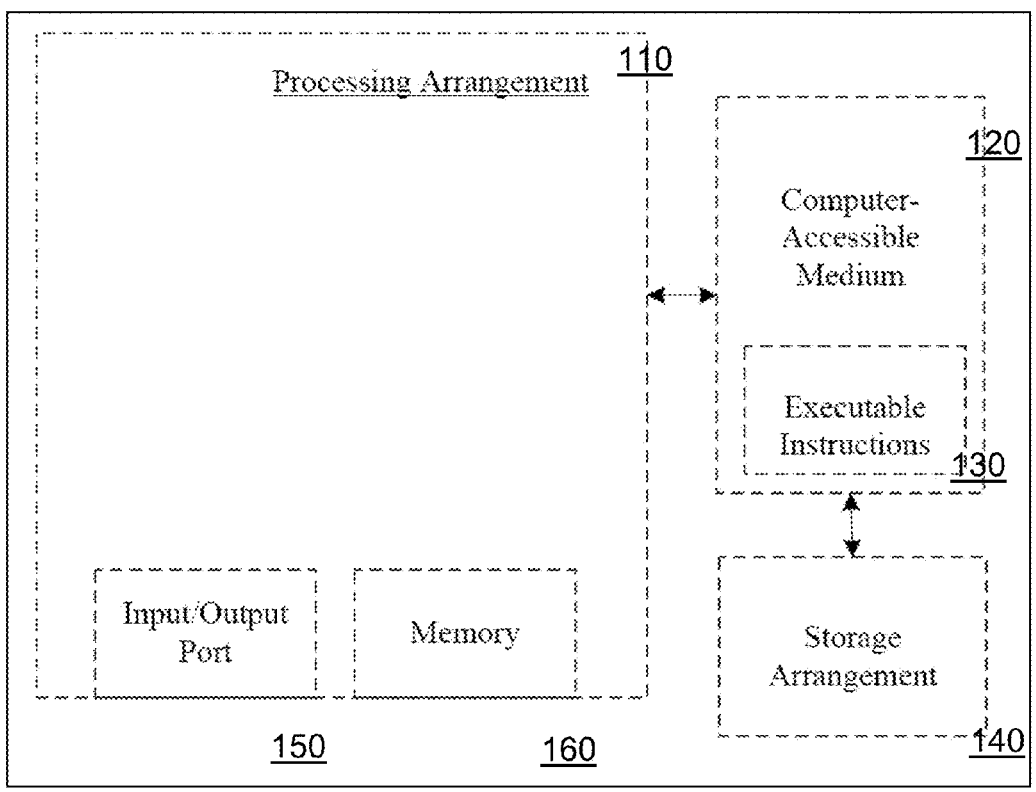
FIG. 4 illustrates an embodiment of a computer system of the present invention.

In one embodiment, shown in FIG. 4, a system 100 is provided. FIG. 4 shows an exemplary block diagram of an exemplary embodiment of a system 100 according to the present disclosure. For example, an exemplary procedure in accordance with the present disclosure can be performed by a processing arrangement 110 and/or a computing arrangement 110. Such processing/computing arrangement 110 can be, e.g., entirely or a part of, or include, but not limited to, a computer/processor that can include, e.g., one or more microprocessors, and use instructions stored on a computer-accessible medium (e.g., RAM, ROM, hard drive, or other storage device).

As shown in FIG. 5, e.g., a computer-accessible medium 120 (e.g., as described herein, a storage device such as a hard disk, floppy disk, memory stick, CD-ROM, RAM, ROM, etc., or a collection thereof) can be provided (e.g., in communication with the processing arrangement 110). The computer-accessible medium 120 may be a non-transitory computer-accessible medium. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example.

System 100 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of predicting temperature increase for a material comprising:
   applying a radio frequency dosage to a tissue;
   determining, for an initial SAR segment having a first radio frequency dosage, an initial temperature response of the tissue ($T_0(t)$) at an initial amplitude ($c_0$) and initial duration ($\Delta$);
   predicting a change in temperature of the tissue for an arbitrary sequence of SAR segments where the temperature response to a single segment is known;
   wherein the temperature change is estimated using the equation $$T_n(t) = \sum_{n=1}^{N} \frac{c_n}{c_0} T_0(t - n\Delta t)$$

where $c_n$ is the amplitude of the $n^{th}$ SAR segment applied, t is time, $T_n(t)$ is the temperature after the $n^{th}$ SAR segment, and $T_0(t)$ is the initial temperature response to the initial SAR segment with amplitude of $c_0$ and duration $\Delta t$;
   altering the radio frequency dosage to the tissue to a second radio frequency dosage; and
   calculating a new temperature of the tissue based on the predicted temperature change equation and the second radio frequency dosage.

2. The method of claim 1, wherein predicting the change in temperature of the tissue for the second radio frequency dosage comprises convolving a temperature response curve with a sequence of N scaled segments.

3. The method of claim 1, further comprising calculating Cumulative Equivalent Minutes at 43 degrees (CEM43) or other measure of thermal dose for the tissue.

4. The method of claim 1, wherein the predicted change in temperature is based on a bioheat model where the relationship between SAR and temperature is linear.

5. The method of claim 1, wherein the predicted change in temperature is based on a bioheat model where wherein blood temperature $T_{bl}$ is either time dependent or time invariant.

6. A computer-implemented machine for measuring long-term temperature increase for a tissue comprising:
   a MRI machine having a coil;
   a processor in communication with the MRI machine; and a tangible computer-readable medium operatively connected to the processor and including computer code configured for:

applying, via the coil, a first radio frequency dosage to a tissue for an initial SAR segment;

determining, for an initial SAR segment, an initial temperature response ($T_0(t)$) at an initial amplitude ($c_0$) and initial duration ($\Delta$);

determining a temperature increase prediction for a tissue or material wherein a change in temperature is estimated using the equation $$T_n(t) = \sum_{n=1}^{N} \frac{c_n}{c_0} T_0(t - n\Delta t)$$

where $c_n$ is the amplitude of the $n^{th}$ SAR segment applied, t is time, $T_n(t)$ is the temperature after the $n^{th}$ SAR segment, and $T_0(t)$ is the temperature response to a SAR segment with amplitude of $c_0$ and duration $\Delta t$; and predicting a second SAR segment temperature change of the tissue for a second SAR segment having a second radio frequency dosage, wherein the prediction is based upon the change in temperature estimate.

7. The computer-implemented machine of claim 6, further comprising:

computer code configured wherein predicting the second SAR segment temperature change comprises convolving a temperature response curve with a sequence of N scaled segments.

8. The computer-implemented machine of claim 6, further comprising:

computer code configured for:

calculating Cumulative Equivalent Minutes at 43 degrees (CEM43) or other measure of thermal dose for the tissue.

9. The computer-implemented machine of claim 6, further comprising:

computer code configured wherein the predicted change in temperature is based on a bioheat model where the relationship between SAR and temperature is linear.

\* \* \* \* \*